(12) United States Patent
Bruce et al.

(10) Patent No.: US 8,119,271 B1
(45) Date of Patent: Feb. 21, 2012

(54) SYSTEMS, METHODS, AND APPARATUS FOR BATTERY COOLING AND PROTECTION

(75) Inventors: Brian Bruce, Austin, TX (US); Ahmad Chamseddine, Round Rock, TX (US)

(73) Assignee: Augmentix Corporation, Austin, TX (US)

( * ) Notice: Subject to any disclaimer, the term of this patent is extended or adjusted under 35 U.S.C. 154(b) by 724 days.

(21) Appl. No.: 12/204,586

(22) Filed: Sep. 4, 2008

Related U.S. Application Data

(60) Provisional application No. 60/967,421, filed on Sep. 4, 2007.

(51) Int. Cl.
*H01M 2/10* (2006.01)
*H01M 2/00* (2006.01)
*H01M 2/08* (2006.01)

(52) U.S. Cl. ......... 429/100; 429/163; 429/172; 429/185
(58) Field of Classification Search .................. None
See application file for complete search history.

(56) References Cited

U.S. PATENT DOCUMENTS

| | | | | |
|---|---|---|---|---|
| 3,909,301 A | * | 9/1975 | Schenk, Jr. | 429/208 |
| T100,803 I4 | * | 7/1981 | Morrow | 292/285 |
| 5,800,942 A | * | 9/1998 | Hamada et al. | 429/148 |
| 6,058,012 A | * | 5/2000 | Cooper et al. | 361/704 |
| 2007/0069913 A1 | * | 3/2007 | Hatten et al. | 340/691.1 |

* cited by examiner

*Primary Examiner* — Barbara Gilliam
*Assistant Examiner* — Jennifer Rea
(74) *Attorney, Agent, or Firm* — Sprinkle IP Law Group

(57) ABSTRACT

One embodiment provides an electronic device (for example, a ruggedized laptop computer) which includes a housing, a battery compartment, and a battery cover. The cover can have a thickness sufficient to protect the battery from damage. The cover can include a body, a conductive heat transfer device (for instance a conductive pad), and a convective heat transfer device (for instance, a plurality of fins). The conductive device can be on the inside of the cover and can abut the battery. Together, the conductive heat transfer device, the body of the battery cover, and the convective heat transfer device can form a heat transfer path from the battery to the environment which has a low overall heat transfer coefficient. The convective device can be a plurality of fins recessed into the exterior of the cover. A gusset can be on the interior of the cover and can correspond with the recess.

20 Claims, 6 Drawing Sheets

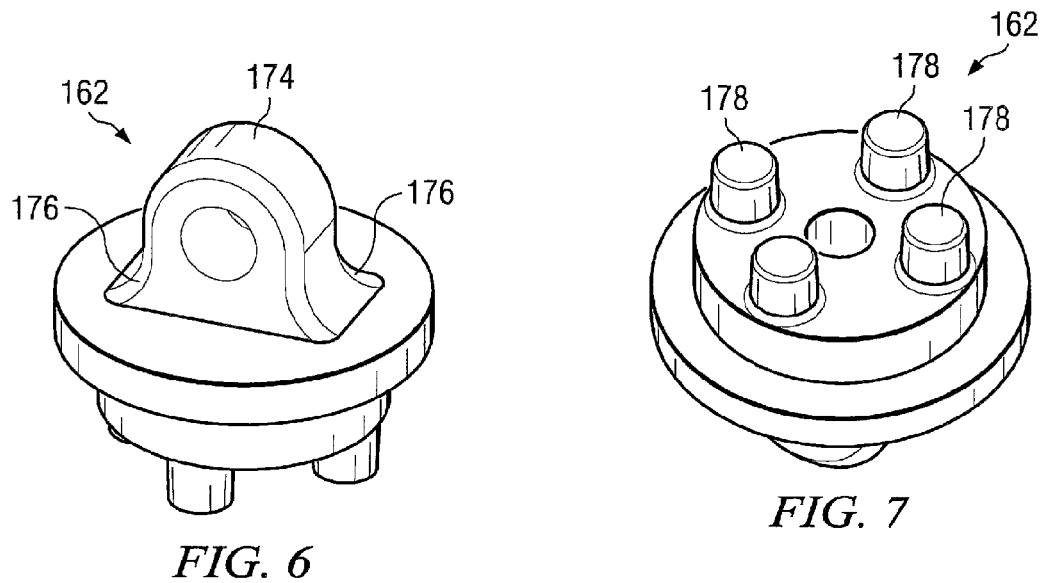
FIG. 6
FIG. 7
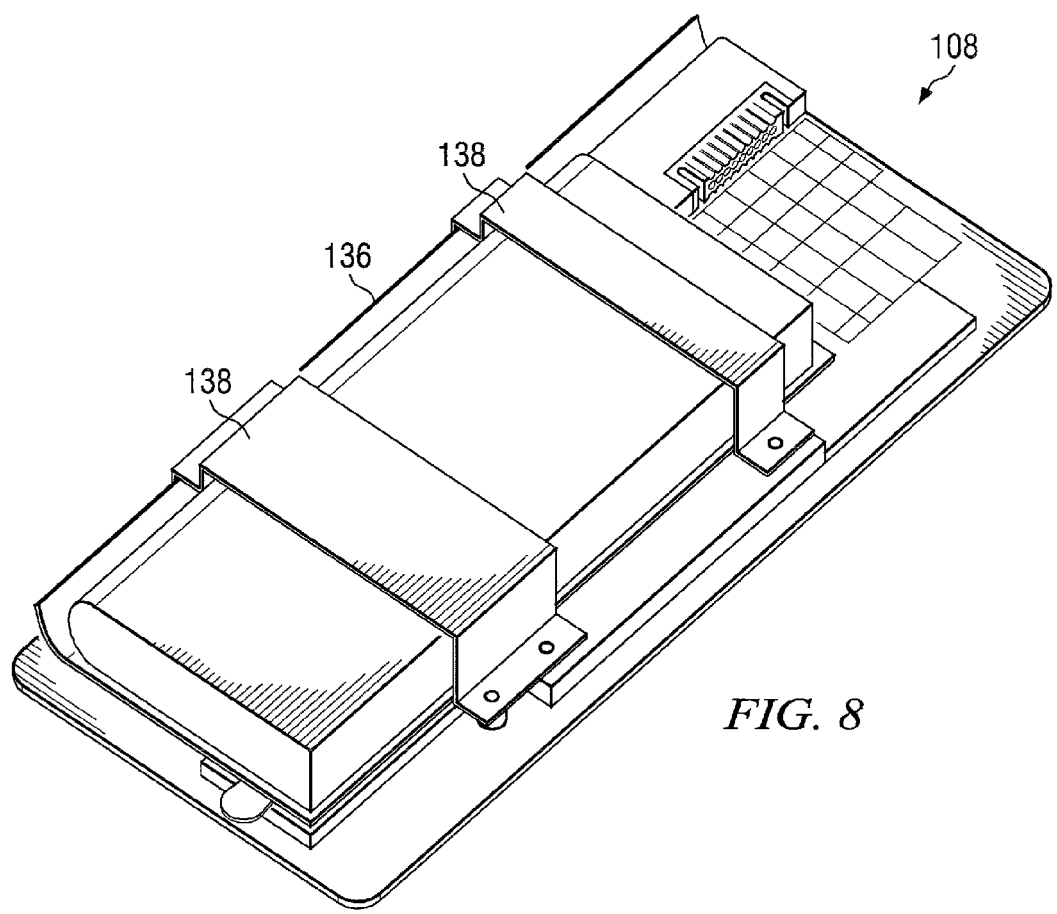
FIG. 8

SYSTEMS, METHODS, AND APPARATUS FOR BATTERY COOLING AND PROTECTION

RELATED APPLICATIONS

This application claims priority under 35 U.S.C. §119(e) to U.S. Provisional Patent Application No. 60/967,421, entitled "System, Method and Apparatus for Battery Cooling and Protection" by Bruce, et al., filed on Sep. 4, 2007, which is hereby fully incorporated by reference herein.

TECHNICAL FIELD

Embodiments of the disclosure relate generally to electronic devices and more particularly to cooling and protecting the batteries of portable electronic devices.

BACKGROUND

Portable electronic devices often include batteries to power the devices when power outlets may not be available, convenient, or functioning. As portable electronic devices have become more powerful (for example, by inclusion of more features), the batteries used in conjunction with them have tended to grow in capacity as measured by their ampere-hour ratings. Many users of these electronic devices prefer lithium-ion batteries because of their high storage capacity. Moreover, lithium-ion batteries can be re-charged, have high capacity-to-weight ratios, and retain their charges well when not powering the device. Thus, many users power their portable electronic devices (such as laptop computers, telecommunication equipment, entertainment devices, etc.) with lithium-ion batteries.

Batteries in general, and more particularly lithium-ion batteries, have certain disadvantages. For instance, some lithium-ion batteries tend to warm during operation due to Joule heating within the batteries. Joule heating arises from the battery generated current flowing through internal features of the battery which offer some resistance to the flow of that current. Joule heating increases in proportion to the square of the current. Thus, when large current draws occur on the battery, Joule heating can increase sharply thereby driving the battery temperature higher. As the temperature of some lithium-ion batteries increases, cells within the batteries can become unstable and begin internally discharging across their negative and positive terminals. This discharge can generate Joule heating and warm the battery further. In turn, the increasing temperature causes further instability, discharge, and (potentially) the loss of the battery.

Another disadvantage associated with using batteries to power portable electronic devices arises from various mechanical features of the batteries. More particularly, lithium-ion batteries typically include numerous cells each of which has a layer of carbon and a layer of lithium cobalt oxide separated by a separator. The carbon layer is typically connected to the negative terminal whereas the lithium cobalt layer is typically connected to the positive terminal of the cell. The separator is usually a sheet of insulating material. Should the case of a lithium-ion cell be punctured the separator can be damaged thereby creating an electrical "short" circuit between the electrodes. Short-circuited cells can discharge across their electrodes leading to rapid warming of the cell, possible loss of the cell, and warming of adjacent cells with an attendant possibility that these adjacent cells might also be lost. Yet, as more electronic devices become portable and require increasing amounts of power, the possibility that one or more cells might be subject to mechanical abuse increases.

In addition, high storage and operating temperatures can disadvantageously affect batteries too. For instance, battery life tends to decrease with increasing operating and storage temperatures. Indeed, lithium-ion batteries (some of which loose capacity with time regardless of their thermal environment) can lose capacity at an accelerated rate when stored or operated in warm environments. Yet, as more electronic devices become portable, their batteries are becoming increasingly exposed to wide thermal variations.

SUMMARY OF THE DESCRIPTION

Embodiments of the present disclosure provide systems, methods, and apparatus for cooling and protecting batteries in electronic devices that eliminate, or at least substantially reduce, the shortcomings of previously available systems, methods, and apparatus for cooling and protecting batteries in portable electronic devices.

One embodiment provides an electronic device which includes a housing, a battery compartment in the housing, a battery in the battery compartment; and a battery cover coupled to the housing. The battery cover can have an overall thickness (which, in some embodiments, can be about two millimeters) sufficient to protect the battery from mechanical damage. The battery cover can include a body, a conductive heat transfer device, and a convective heat transfer device. Together, the conductive heat transfer device, the body of the battery cover, and the convective heat transfer device can form a heat transfer path from the battery to the environment. In some embodiments, the battery cover can limit the temperature rise experienced by the battery (while the electronic device operates in a 60 degree Celsius environment) to no more than about 8 degrees Celsius and can withstand the mechanical forces, shocks, etc. associated with portable electronic device 100 being dropped from 36 inches on a non yielding surface and on any face, corner, etc.

In some embodiments, the conductive heat transfer device can be a conductive pad positioned on the internal surface of the battery cover and abutting the battery. The convective heat transfer device can include a plurality of fins recessed into the external surface of the battery cover. A gusset on the internal surface of the battery cover can be positioned to correspond with the recess on the external surface of the battery cover. A latch assembly can couple the battery cover to the housing. In some embodiments, the electronic device can be a ruggedized personal computer.

Battery covers of various embodiments provide both mechanical protection of, and thermal management for, batteries in electronic devices. Batteries in electronic devices of various embodiments can be charged to higher levels at higher charge rates than heretofore possible. Moreover, the charging of batteries of various batteries can occur in warmer environments than was previously possible.

These, and other, aspects will be better appreciated and understood when considered in conjunction with the following description and the accompanying drawings. The following description, while indicating various embodiments and numerous specific details thereof, is given by way of illustration and not of limitation, Many substitutions, modifications, additions, or rearrangements may be made within the scope of the disclosure, and the disclosure includes all such substitutions, modifications, additions, or rearrangements.

BRIEF DESCRIPTION OF THE FIGURES

A more complete understanding of the disclosure and the advantages thereof may be acquired by referring to the following description, taken in conjunction with the accompanying drawings in which like reference numbers generally indicate like features.

FIG. 6 illustrates a perspective view of an embodiment of a latch adaptor.

FIG. 7 illustrates a perspective view of an embodiment of a latch adaptor.

FIG. 8 illustrates a perspective view of one embodiment of a battery cover.

DETAILED DESCRIPTION

Various embodiments of the disclosure are illustrated in the FIGURES, like numerals being generally used to refer to like and corresponding parts of the various drawings. Embodiments of the disclosure provide systems, methods, and apparatus for cooling and protecting batteries in portable electronic devices.

As used herein, the terms "comprises," "comprising," "includes," "including," "has," "having" or any other variation thereof, are intended to cover a non-exclusive inclusion. For example, a process, article, or apparatus that comprises a list of elements is not necessarily limited only those elements but may include other elements not expressly listed or inherent to such process, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Additionally, any examples or illustrations given herein are not to be regarded in any way as restrictions on, limits to, or express definitions of, any term or terms with which they are utilized. Instead, these examples or illustrations are to be regarded as being described with respect to one particular embodiment and as illustrative only. Those of ordinary skill in the art will appreciate that any term or terms with which these examples or illustrations are utilized will encompass other embodiments which may or may not be given therewith or elsewhere in the specification and all such embodiments are intended to be included within the scope of that term or terms. Language designating such nonlimiting examples and illustrations includes, but is not limited to: "for example", "for instance", "e.g.", "in one embodiment".

Figure 1:
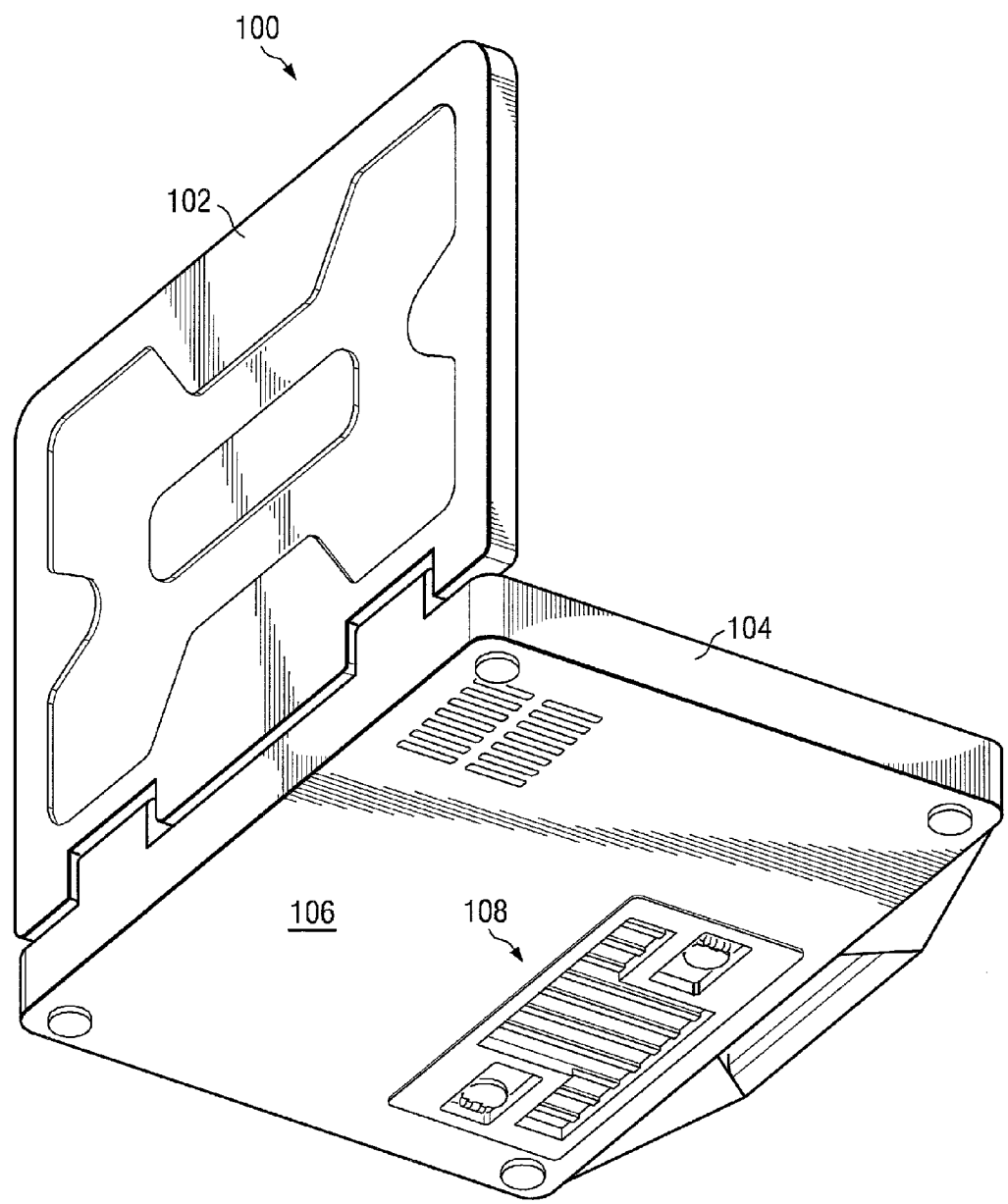
FIG. 1 illustrates a perspective view of one embodiment of a portable electronic device.

FIG. 1 illustrates a perspective view of one embodiment of portable electronic device 100. Portable electronic device 100 can be a laptop computer (e.g., such as a Dell Latitude™ D620 ruggedized laptop computer which are available from the Augmentix Corporation of Austin, Tex.), a piece of telecommunications equipment, an entertainment device, etc. Portable electronic device 100 can operate in, or be stored in, a wide variety of locations and environments. In some cases, portable electronic device 100 can operate in a nominal "shirt-sleeve" environment in which humidity, temperature, potential mechanical abuse, etc. are relatively controlled. In some cases, portable electronic device 100 can be subjected to less moderate environments in which ambient conditions can vary more widely. For instance, portable electronic device 100 can be taken outdoors where temperatures can vary between about minus 18 degrees Celsius (0 degrees Fahrenheit) and about 38 degrees Celsius (100 degrees Fahrenheit). In addition, being portable, portable electronic device 100 can be subjected to drops, collisions with blunt objects, collisions with more sharply pointed objects (i.e. potential penetrations of portable electronic device 100), etc.

Portable electronic device 100 can be used by consumers, industrial users, law enforcement members, members of the military, members of the Department of Homeland Security, etc. in a wide variety of locations and environments. Some conditions which portable electronic device 100 (and components thereof) can withstand include but are not limited to:

Drop/Shock
  36" drops to non-yielding surfaces (while not operating) on all faces and corners.
Vibration
  Operation under random vibration to, for example, simulate 1000 miles of transport.
Exaggerated Rain
  4" of rain per hour as simulated by 40 psi spraying water pressure at portable electronic device 100 along 6 axes.
Blowing Dust
  Dust particles blowing at 8.7 m/s (19.5 mph) with ambient temperatures up to 140° F. (60° C.).
Dust Ingress
  Ingress of dust.
Splashing Water
  Water spraying at all angles at 10 liters/min at a gage pressure of 80-100 kN/m2 for 5 min.
Humidity
  0%-95% non-condensing humidity.
Salt Fog Spray
  5% saline solution for 48-hour cycles.
Crash Shock Test
  40 g, 11 m/s: 75 g, 6 m/s, terminal saw tooth.
Altitude
  15,000 feet, operational and non-operational.
Temperature Extremes (Operating/Non-Operating)
  Operation in temperatures from −20° F. to 140° F., (−29° C. to 60° C.) and storage in temperatures from −60° F. to 160° F. (−51° C. to 71° C.).
Temperature Cycling
  Temperature shock from −60° F. to 205° F. (−51° C. to 96° C.).

Thus, portable electronic device 100 can withstand a wide range of mechanical and thermal environmental conditions. More particular, battery covers of some embodiments can limit the temperature rise experienced by the battery (while the electronic device operates in a 60 degree Celsius environment) to no more than about 8 degrees Celsius and can withstand the mechanical forces, shocks, etc. associated with portable electronic device 100 being dropped from 36 inches on a non yielding surface and on any face, corner, etc. In addition, portable electronic device 100 can be configured to operate in hazardous locations such as those associated the National Electric Code, Class 1, Division 2, Groups A, B, C, and D among others.

With continuing reference to FIG. 1, portable electronic device 100 can include elements 102 such as displays, keyboards, pointing devices, etc. for user convenience and for use in operating portable electronic device 100. Portable electronic device 100 can include overmolded bumpers 104 on housing 106 to protect portable electronic device 100 and portions thereof from mechanical forces, shocks, etc. Housing 106 can provide a frame on which various components of portable electronic device 100 can be mounted. Housing 106 can also provide compartments for various components, accessories, etc. of portable electronic device 100. Portable electronic device 100 can also include various covers such as battery cover 108 to provide access to various components and compartments of portable electronic device 100.

Figure 2:
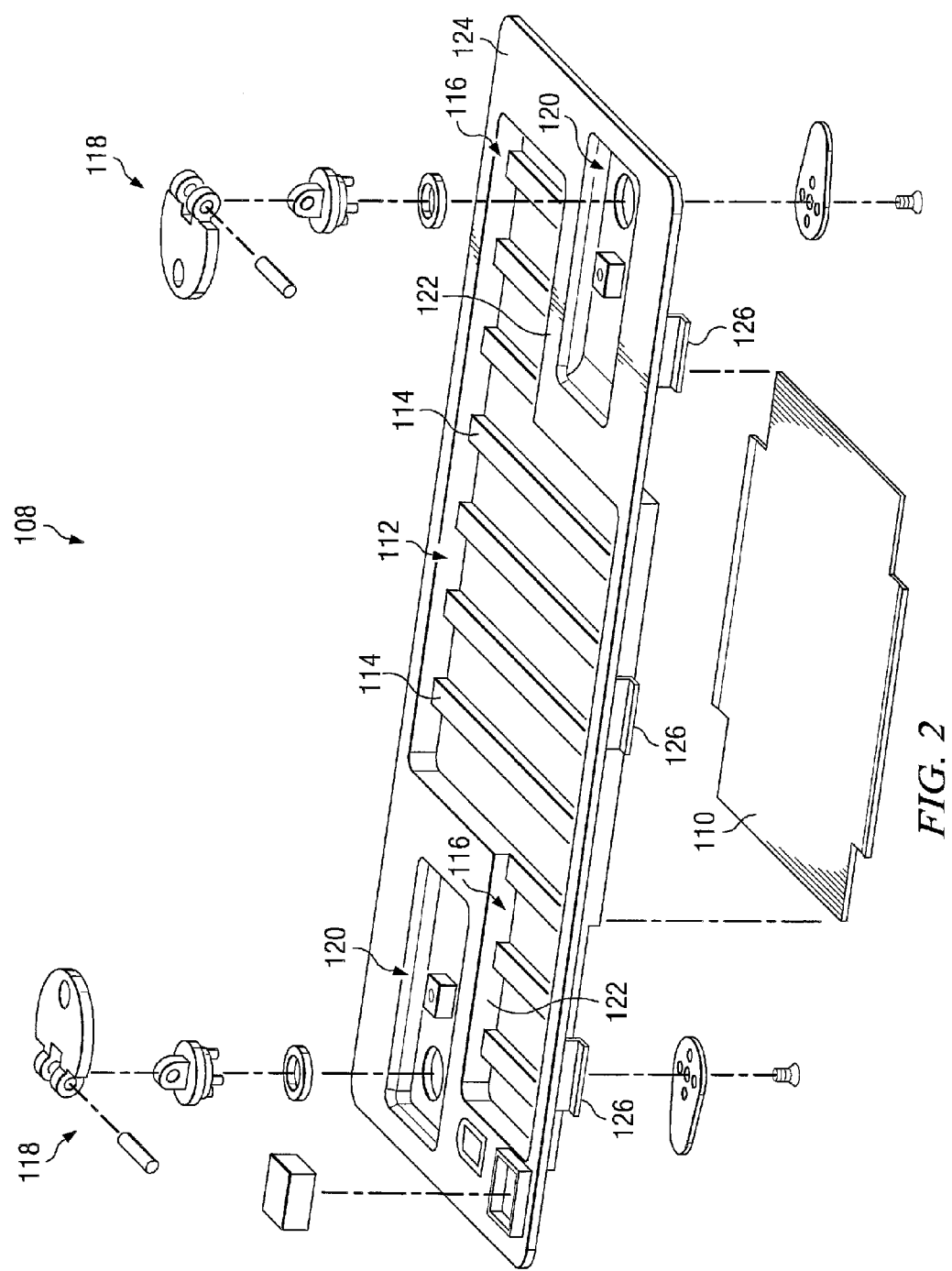
FIG. 2 illustrates an exploded view of one embodiment of a battery cover.

FIG. 2 illustrates portable electronic device 100 including battery cover 108, conductive heat transfer device 110, cover recess 112, convective heat transfer devices 114, channels 116, latch assemblies 118, latch recesses 120, latch gussets 122, external surface 124, bosses 126, and footrest 130. Covers such as battery cover 108 can be included on portable electronic device 100 to close and seal various compartments, connectors, openings, etc. Battery cover 108 can serve to protect one or more batteries in housing 106 from mechanical forces, shocks, etc. and provide thermal management for such batteries. Battery cover 108 can also include one or more latch assemblies 118 to removably couple battery cover 108 to housing 106. In some embodiments, battery cover 108 can be formed from die cast AZ91D magnesium. Moreover, battery cover 108 can weigh as little as 0.0836 kilograms (0.184 pounds) thereby minimizing its contribution to the overall weight of portable electronic device 100.

Figure 3:
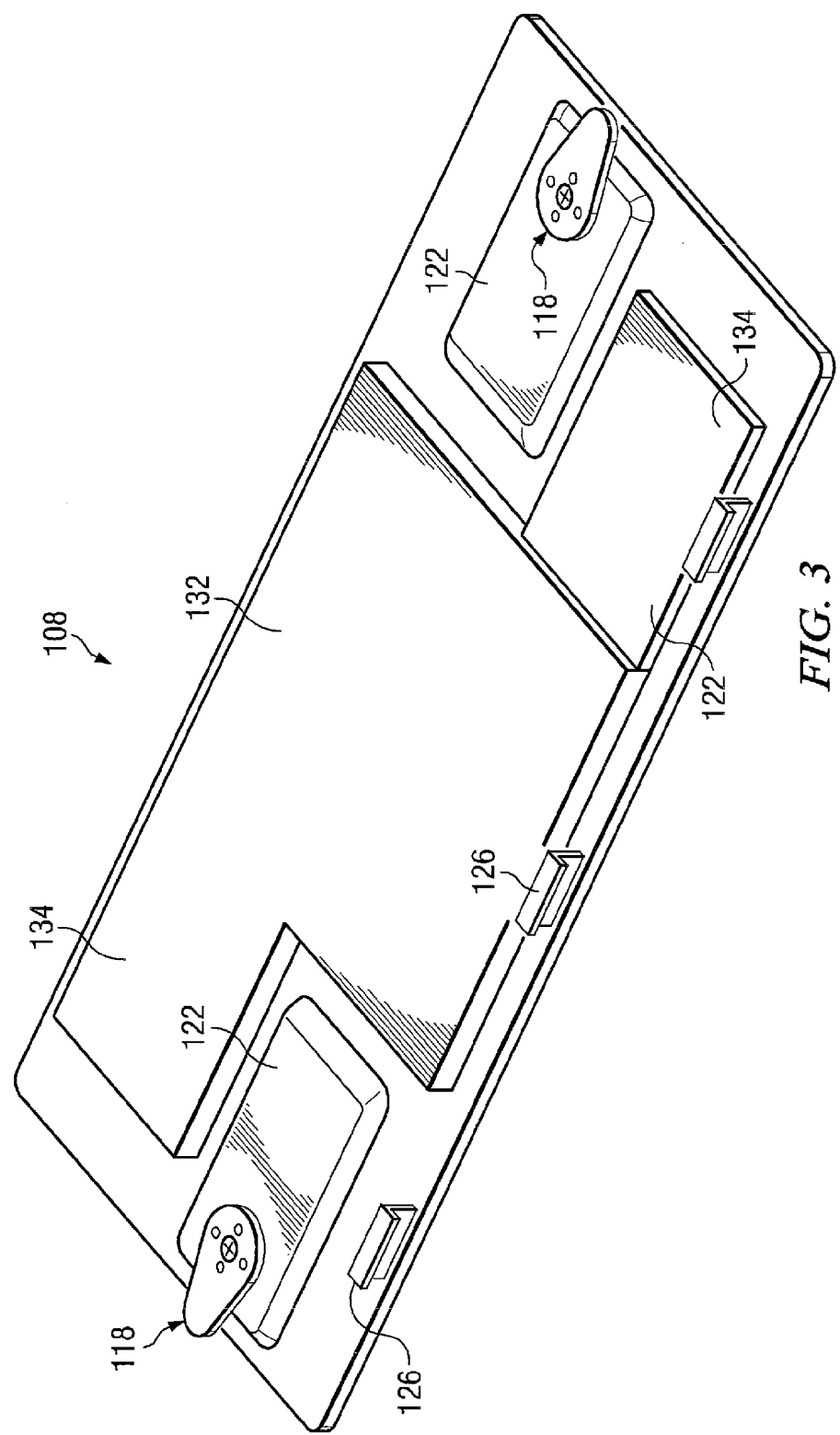
FIG. 3 illustrates a perspective view of one embodiment of a battery cover.

Battery cover 108 and housing 106 can be configured so that battery cover 108 can withstand higher mechanical forces, shocks, etc. than housing 106 in some embodiments. Battery cover 108 can be strengthened to resist torsional forces which might be applied to battery cover 108 and/or housing 106. For instance, latch gussets 122 can be shaped, dimensioned, positioned, etc. to resist torsional forces. The configuration, orientation, number, shape, dimensions, positions, etc. of convective heat transfer devices 114 can also be selected to resist torsional forces. In FIG. 3, convective heat transfer devices 114 are illustrated as being gussets orientated perpendicularly to the longitudinal axis of battery cover 108. However, in some embodiments, convective heat transfer devices 114 can be oriented along the longitudinal axis of battery cover 108 or in some other direction. Thus, batteries internal to battery covers 108 can be protected from mechanical forces, shocks, etc. up to (and beyond,) some point at which housing 106 fails.

In some embodiments, as illustrated by FIG. 2, external surface 124 of battery cover 108 can define one or more areas for various purposes. For instance, cover recess 112 can define areas for convective heat transfer devices 114. In some embodiments, latch assemblies 118 and associated structures such as latch recess 120 and latch gusset 122 can be included on battery cover 108. In addition, external surface 124 can include one or more areas to which footrests 130 can be coupled.

With continuing reference to FIG. 2, latch assemblies 118 can be coupled to battery cover 108 at latch recess 120 and can removable couple battery cover 108 to housing 106 (see FIG. 1). Latch assemblies 118 can extend through the body of battery cover 108 so that, on the internal side of battery cover 108, latch assemblies 118 can engage corresponding features of housing 106 and, on the external side of battery cover 106, users can actuate latch assemblies 118. In engaging housing 106, latch assemblies 118 can urge battery cover 108 toward bulkhead 141 thereby placing conductive pad 111 and battery 136 in compression against each other and the body of battery cover 108. Latch gussets 122 can provide structural strength to battery cover 108 in the vicinity of latch recesses 120. Latch assemblies 118 can be configured to lie within latch recesses 120 so that portable electronic device 100 can rest on various surfaces without interference from latch assemblies 118.

In some embodiments, latch assemblies 118 can be butterfly latch assemblies as discussed with reference to FIG. 5 although any type of latch, fastener, catch, hasp, clasp, clamp, detent, etc. can be used in lieu of latch assemblies 118. In addition to latch assemblies 118, battery cover 108 can include bosses 126 for aligning battery cover 108 with housing 106 and assisting latch assemblies 118 with securing battery cover 108 thereto.

Conductive heat transfer device 110 can be coupled to battery cover 108 as illustrated by FIG. 2. For instance, conductive heat transfer device 110 may be thermally bonded to battery cover 108 in a variety of manners including soldering, brazing, using a thermal adhesive, etc. Thus, the interface between conductive heat transfer devise 110 and the body of battery cover 108 can present relatively little resistance to conductive heat transfers between conductive heat transfer device 110 and the body of battery cover 108.

Battery cover 108 can include one or more convective heat transfer devices 114 on its external surface 124. Convective heat transfer devices 114 can be fins which convectively transfer heat from batteries of portable electronic device 100 to the environment. External surface 124 of battery cover 108 can define cover recess 112 in which convective heat transfer devices 114 can be positioned. Convective heat transfer devices 114 can be any type of convective heat transfer devices 114 such as fins, rods, cylinders, etc. which can increase the surface area of external surface 124 of battery cover 108. With increased surface area due to convective heat transfer devices 114, external surface 124 can transfer more heat to the environment than would otherwise occur. Cover recess 112 can maximize the portion of external surface 124 for convective heat transfer devices 114 while providing suitable portions for latch assemblies 118. With convective heat transfer devices 114 in cover recess 112, cover recess 112 can allow portable electronic device 100 to rest relatively flatly on surfaces such as desks, counters, dashboards, etc.

With reference now to FIG. 3, the body of battery cover 108, latch assemblies 118, latch gusset 122, bosses 126, internal surface 128 of battery cover 108, cover gusset 132, and gusset portions 134 are illustrated. Cover gusset 132 and gusset portions 134 can extend longitudinally along battery cover 108 and correspond in position, shape, and dimensions to cover recess 112 and channels 116 (see FIG. 2). Latch gusset 122 can correspond in position, shape, and dimensions to latch recess 120. Either alone, or in combination, latch gusset 122 and cover gusset 132 can reinforce battery cover 108 against torsion and other mechanical forces, shocks, etc.

Figure 4:
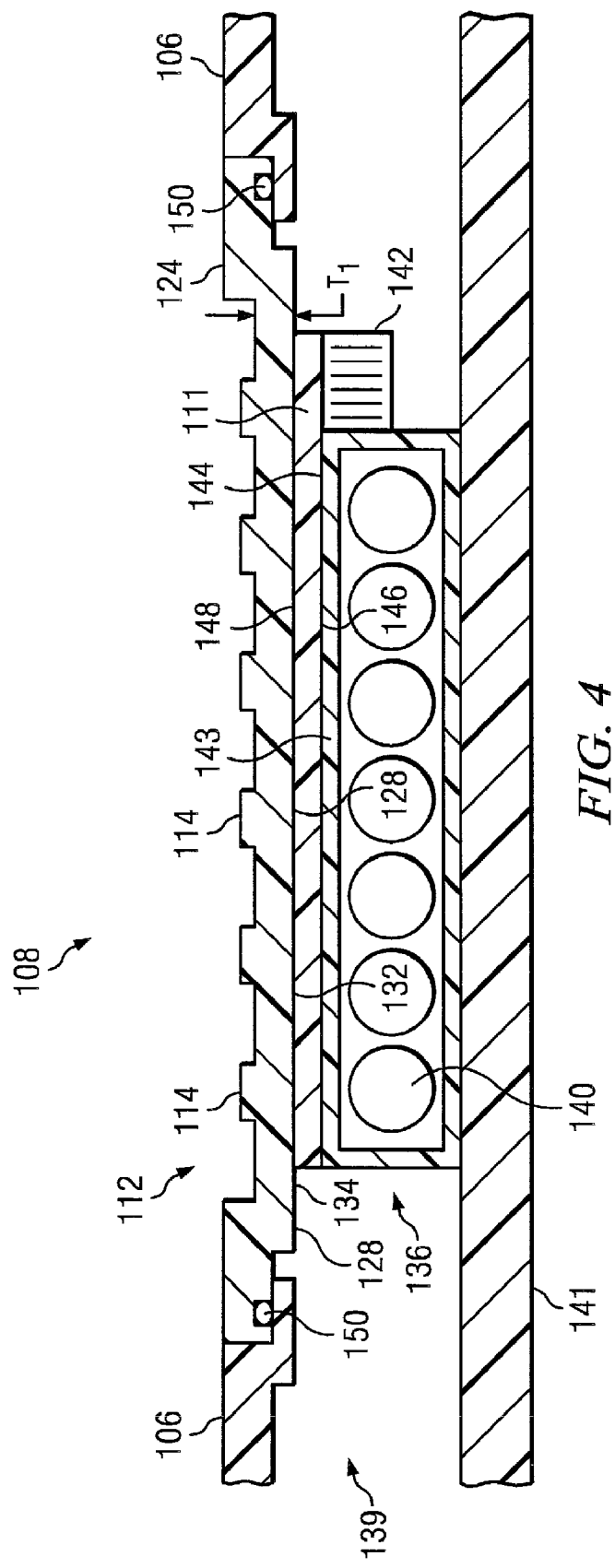
FIG. 4 illustrates a cross-sectional view of one embodiment of a battery compartment.

FIG. 4 illustrates a cross-sectional view of one embodiment of battery compartment 139 of portable electronic device 100. FIG. 4 illustrates housing 106 of portable electronic device 100, battery cover 108, conductive heat transfer device 110, cover recess 112, convective heat transfer devices 114, external surface 124, internal surface 128, battery 136, battery compartment 139, cell 140, bulkhead 141, battery connector 142, battery package 143, battery surface 144, first pad surface 146, second pad surface 148, and gasket 150.

Bulkhead 141 can be a portion of a larger component of portable electronic device 100. In some embodiments, bulkhead 141 can form one or more internal panels of battery compartment 139. Battery cover 108 can fit in a recess of housing 106 of portable electronic device 100 such that it covers battery compartment 139. Battery cover 108 can form an external panel of battery compartment 139 and can (in conjunction with gasket 150 and bulkhead 141) seal battery compartment 139 against intrusion by water, dust, chemicals, etc. Cover gusset 132 can extend across battery 136 (and conductive pad 111) and, in some embodiments, gusset portion 134 can extend longitudinally from the cover gusset 132.

The body of battery cover 108 can have a minimum thickness t1 of about 2 millimeters which can correspond to the thickness of housing 106, bulkhead 141, and other structural components of portable electronic device 100. By forming battery cover 108 and other structural components (e.g., housing 106 and bulkhead 141) from approximately the same material and at approximately the same thickness t1, cracking of various structural components (including battery cover 108) subject to mechanical forces, shocks, etc. can be minimized if not avoided. Structures of housing 106 such as bulkhead 141 can have thicknesses other than 2 millimeters without departing from the scope of the disclosure. Moreover, thickness t1 can be selected to provide desired degrees of protection for battery 136 from mechanical forces, shocks, etc. Thus, battery cover 108 can protect battery 136 from damage including the possibility that some object(s) traveling relative to battery cover 108 might puncture battery cover 108 (and possibly batteries 136 housed behind battery cover 108).

With continuing reference to FIG. 4, battery 136 can be positioned within battery compartment 139 in abutting relationship with bulkhead 141. Gaps can exist between certain internal panels of battery compartment 139 and battery 136. For instance, gaps can exist between internal panels of battery compartment 139 and the longitudinal ends of battery 136. Conductive pad 111 can rest on, and can pressed against, battery 136 by the body of battery cover 106 acting in cooperation with bulkhead 141 and latch assemblies 118. Conductive pad 111 can correspond with battery 136 in shape, dimensions, position, etc. The body of battery cover 108 can extend longitudinally from the vicinity of battery 136. Such longitudinal extensions of the body of battery cover 108 can, as discussed herein, provide surface area for convective heat transfer from portable electronic device 100 (and more particularly, batteries 136 therein). Longitudinal extensions of battery cover 108 can also provide area for additional convective heat transfer devices 114 beyond those in the general vicinity of battery 136.

In some embodiments, battery 136 can include one or more cells 140 within battery package 143 or some other structure. Cells 140 can generate electric current for portable electronic device 100. As a result, cells 140 can be prone to Joule heating. Convective heat transfer devices 114 can be positioned on battery cover 108 to correspond in position to cells 140 within battery 136. Thus, in some embodiments, each particular cell 140 can have one or more particular convective heat transfer devices 114 positioned adjacent thereto and spaced apart there from by the wall of battery package 143, conductive pad 111, and the body of battery cover 108.

In some embodiments, battery package 143, conductive pad 111, the body of battery cover 108, and convective heat transfer devices 114 can form a heat transfer path between cells 140 and the environment of portable electronic device 100. Thus, as heat flows from cells 140 to the environment, it flows through battery package 143 and encounters the interface between battery surface 144 and first pad surface 146. As discussed herein, battery surface 144 of battery package 143 can be pressed against first pad surface 146 by the combined action of battery cover 108, latch assemblies 118, and bulkhead 141. When conductive pad 111 is formed of a softer material than battery 136, first pad surface 146 can conform to battery surface 144 even when certain levels of particulates, imperfections, irregularities, foreign objects, etc. might be present on, or between, surfaces 144 and 146. Conductive pad 111 can be formed from Gap Pad® 2500S20 which is available from the Bergquist Co. of Chanhassen, Minn. or any conductive material softer than battery surface 144. Thus, thermal contact resistance between surfaces 144 and 146 can be decreased thereby facilitating heat transfer between the two surfaces 144 and 146.

Second pad surface 148 (which can be on the side of conductive pad 111 opposite first pad surface 146) can be thermally bonded to the body of battery cover 108 by soldering, brazing, thermal adhesive, etc. More particularly, conductive pad 111 can be bonded to internal surface 128 of battery cover 108 using TIC™ 4000 thermal interface compound which is available from the Bergquist Co. of Chanhassen, Minn. or any method of thermally bonding conductive pad 111 to internal surface 128 of batter cover 108. Thus, thermal contact resistance between second pad surface 148 and internal surface 128 of battery cover 108 can be reduced, if not eliminated, thereby facilitating heat transfer between surfaces 128 and 148. Being metallic (or some other thermally conductive material), the body of battery cover 108 can allow heat to flow from external surface 124 to convective heat transfer devices 114 and other portions of external surface 124. Heat may transfer from convective heat transfer devices 114 (and other portions of external surface 124) to the environment by convection when fluid is present at convective heat transfer devices 114. Heat may also transfer from convective heat transfer devices 114 by conduction when convective heat transfer devices 114 are in thermal contact with solid material (e.g., a countertop, desktop, dashboard, etc.) Thus, battery cover 108 can provide heat transfer paths from cells 140 (and battery 136) to corresponding convective heat transfer devices 114 as well as to other portions of external surface 124 of battery cover 108.

With continuing reference to FIG. 4, and as discussed herein, operation of portable electronic device 100 can cause Joule heating in cells 140 and other components of battery 136 and portable electronic device 100. More particularly, as portable electronic device 100 operates, electric current can be drawn form battery 136 via battery connector 142. In such scenarios, cells 140 develop the electric current and allow the electric current to flow from cells 140 to battery connector 142 and thence to various components of portable electronic device 100. In flowing from cells 140 to portable electronic device 100, the electric current can encounter certain components offering electrical resistance thereto. For instance, internal structures, impurities, etc. in cells 140 may offer resistance to the electric current. Wires, conductive paths, contacts, etc. within battery 136 can also offer resistance to the flow of the current. As the electric current flows from battery 136, battery connector 142 (and a corresponding connector on portable electronic device 100) can also offer resistance to the electric current.

At each location where some component offers resistance to the electric current, Joule heating can occur. Joule heating can arise from energy losses as the electric current overcomes that resistance. Joule heating varies with both the value of the resistance (typically measured in ohms) and with the square of the current (typically measured in amperes). Thus, while Joule heating can occur when portable electronic device 100 is relatively quiescent, Joule heating can be markedly increased during peak loads imposed on battery 136 by portable electronic device 100. In addition, components of portable electronic device 100 on the side of bulkhead 141 opposite from battery 136 can be subject to Joule heating also. Thus, heat can flow from the side of bulkhead 141 to battery 136. In some embodiments, though, bulkhead 141 can be configured to thermally isolate battery 136 from other heat producing components of portable electronic device 100.

Nonetheless, because of Joule heating within battery compartment 139 (including Joule heating within battery 136), battery 136 can be subject to temperature increases as portable electronic device 100 operates. Furthermore, portable electronic device 100 can be carried into, or stored in, locations with relatively warm thermal environments. In some situations, the thermal environment of portable electronic device 100 can be as warm as 60 degrees Celsius. In these situations, it can be desirable to limit the temperature experienced by battery 136 to 68 degrees Celsius despite Joule heating, heat transferred from other components of portable electronic device 100, and the potentially warm thermal environment of portable electronic device 100.

In operation, heat from battery 136 can flow from battery 136 to conductive heat transfer device 110. More particularly, heat may flow from battery 136 to first pad surface 146, through conductive pad 111, and to second pad surface 148. From second pad surface 148, heat from battery 136 can flow from conductive pad 111 to battery cover 108. Heat entering battery cover 108 from conductive heat transfer device 110 can flow through battery cover 108 to convective heat transfer devices 114. From convective heat transfer devices 114, heat can flow to the environment by convection (when fluids such as air are present) or by conduction when convective heat transfer devices 114 are in contact with solids, or a combination thereof. Heat may also flow longitudinally from portions of battery cover 108 in the vicinity of battery 136 to portions of battery cover 108 (and convective heat transfer devices 114) which are longitudinally spaced apart from battery 136 for transfer to the environment.

Thus, battery cover 108 can allow heat to flow from battery 136 to the environment. In some embodiments, battery 136, conductive heat transfer device 110, battery cover 108, and convective heat transfer devices 114 can be selected and assembled so that the heat transfer path described above can have a relatively high overall heat transfer coefficient.

Figure 5:
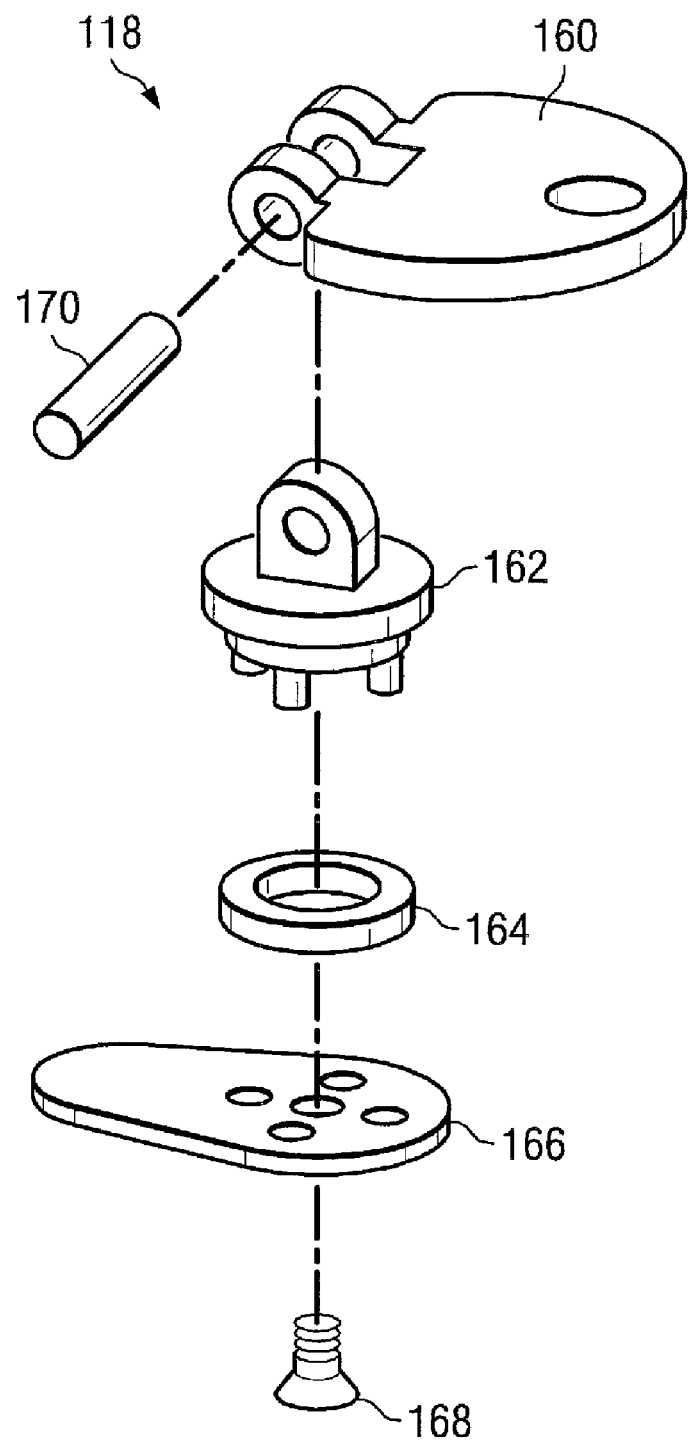
FIG. 5 illustrates an exploded view of one embodiment of a latch assembly.

FIG. 5 illustrates one embodiment of latch assembly 118. Latch assemblies 118 can be configured to releasably couple battery cover 108 to housing 106 of portable electronic device 100. In some embodiments, portable electronic device 100 can include various numbers of latch assemblies 118 including 2 and 4 latch assemblies 118. Latch assemblies can be shaped and dimensioned to withstand mechanical forces, shocks, etc. such as those generated when portable electronic device 100 (which can weight about 10 pounds) when portable electronic device 100 is dropped on a non yielding surface from about 36 inches.

Latch assembly 118 can include toggle 160, adaptor 162, gasket 164, cam 166, fastener 168, pin 170, and latch 172. Adaptor 162 can extend through an aperture in body cover 108 to align with one or more bosses on toggle 160 such that toggle 160 and adaptor 162 can receive pin 170 generally adjacent to external surface 124 of battery cover 108 (when latch assembly 118 is installed thereon). Fastener 168 can couple cam 166 to adaptor 162 and compress gasket 164 there between thereby sealing the aperture in battery cover 108 through which latch assembly 118 can extend. Cam 166 can be rotated, via toggle 160 and adaptor 162, between a closed position and an opened position. Cam 166, in the closed position, can engage corresponding features in bulkhead 142 to couple battery cover 108 to housing 106 through bulkhead 142. Cam 166 (and the corresponding feature on bulkhead 142) can be shaped and dimensioned to urge battery cover 108 toward bulkhead 141 in the closed position. In the opened position, cam 166 can be disengaged from housing 106, thereby releasing battery cover 108 from housing 106. Latch assembly 118 can be configured to withstand mechanical forces, shocks, etc. applied to battery cover 108 (or itself). Thus, latch assembly 118 can releasably couple battery cover 108 to housing 106 of portable electronic device 100 even in the presence of various mechanical forces, shocks, etc.

With continuing reference to FIG. 5, in some embodiments, toggle 160 can be made of PC+ABS GE C7410 (Grade UL 94V-0) plastic, CRCA, nylon, 304 stainless steel, etc. In one embodiment, toggle 160 (made of nylon) can be shaped and dimension to withstand torque up to about 1.796 pound-inches (and a force of about 2.664 pounds applied to develop the torque) when cam 166 is closed (or fully open) and unable to move in response to torque applied to toggle 160.

With reference now to FIG. 6 one embodiment of adaptor 162 of latch assembly 118 is illustrated. Adaptor 162 can include boss 174 for receiving pin 170. Boss 174 can be shaped and dimensioned to withstand mechanical forces, shocks, etc. that might be applied directly to it, or transmitted to it by pin 170 and toggle 160. More particularly, filets 176 can be shaped and dimensioned to withstand forces applied thereto. With reference to FIG. 7, adaptor 162 can also include posts 178 on the side of adaptor 162 opposite boss 174. Posts 178 can space adaptor 162 apart from the external surface of latch recess 120 so that gasket 164 can be compressed by an appropriate amount to seal latch assembly 118 and battery cover 108. Posts 178 can also slidably engage the external surface of latch recess 120 so that users can turn toggle 160 thereby moving latch assembly 118 between its open and closed positions. Posts 178 can be shaped and dimensioned to withstand mechanical forces, shocks, etc. applied to or transmitted to thereto. More particularly, adaptor 162 can be made from magnesium and can be shaped and dimensioned to withstand torque (transmitted thereto by pin 170 at boss 174) up to about 6.75 pound-inches.

Cams 166 can be shaped and dimensioned to withstand various mechanical forces, shocks, etc. transmitted thereto. Cams 166 can be made from various stainless steels, corrosion resistant steels, etc. For instance, in one embodiment, portable electronic device 100 can include 4 latch assemblies 118 and can weigh about 10 pounds. Cams 166 of the four latch assemblies of the current embodiment can absorb mechanical forces, shocks etc. developed when portable electronic device 100 is dropped on a non yielding surface from about 36 inches. In some embodiments, cams 166 can be about 1.5 mm to about 1.9 mm thick.

FIG. 8 illustrates a perspective view of one embodiment of battery cover 108 with battery 136 removably coupled thereto by brackets 138. Battery 136 can be secured to battery cover 108 with devices other than brackets 138 such as straps, hooks, detents, bayonet connectors, etc. Conductive heat transfer device 110 can be positioned between the body of battery cover 108 and battery 136 in some embodiments. Thus, brackets 138 can hold battery 136 against conductive heat transfer device 110 thereby compressing conductive heat transfer device 110; conforming it to battery surface 144; and lowering thermal contact resistance between battery 136 and conductive heat transfer device 110. Battery cover 108, with battery 136 coupled thereto by brackets 138, can be coupled to housing 106 with battery 136 positioned in battery compartment 139. Portions of brackets 138 passing between battery 136 and bulkhead 141 (see FIG. 4) can create a gap between battery 136 and bulkhead 141 thereby increasing thermal isolation between battery 136 and other heat producing components of portable electric device 100.

Embodiments disclosed herein can both protect batteries from damage and provide enhanced heat transfer there from. Embodiments of battery covers can extend the lives of batteries housed in battery compartments covered by such battery covers. Batteries, when housed in battery compartments disclosed herein, can have greater life and faster recharge capabilities than heretofore possible. Embodiments of portable electronic devices disclosed herein can be operated, and stored, in warmer environments than heretofore possible.

Although embodiments have been described in detail herein, it should be understood that the description is by way of example only and is not to be construed in a limiting sense. It is to be further understood, therefore, that numerous changes in the details of the embodiments and additional embodiments will be apparent, and may be made by, persons of ordinary skill in the art having reference to this description. It is contemplated that all such changes and additional embodiments are within scope of the claims below and their legal equivalents.

What is claimed is:

1. An electronic device comprising:
   a housing;
   a battery compartment in the housing, wherein the battery compartment is isolated by a bulkhead and is configured to accept a battery comprising a battery cell;
   a battery cover including a body including an external surface, an internal surface, and a convective heat transfer device on the external surface of the battery cover, the body having a thickness between the internal surface and the external surface of about two millimeters, the convective heat transfer device formed to increase the surface area of the external surface of the battery cover;
   a conductive heat transfer device on the internal surface of the battery cover, wherein the conductive heat transfer device is formed of a softer material than the battery;
   a latch assembly for coupling the battery cover to the housing, wherein actuating the latch assembly compresses the conductive heat transfer device against the battery and further compresses the battery cover against the conductive heat transfer device, wherein the conductive heat transfer device, the body of the battery cover, and the convective heat transfer device form a heat transfer path from the battery to the environment;
   a gasket interposed between the battery cover and the housing, wherein the battery cover, the gasket and the bulkhead seal the battery compartment; and wherein the outer surface of the battery cover defines a recess and wherein the convective heat transfer device is in the recess, wherein the convective heat transfer device comprises fins, rods or cylinders.

2. The electronic device of claim 1, wherein the conductive heat transfer device corresponds with the battery in shape.

3. The electronic device of claim 1, wherein the convective heat transfer device is positioned to correspond to the battery cell.

4. The electronic device of claim 1, further comprising a gusset on the internal surface of the battery cover and being positioned to correspond to the recess.

5. The electronic device of claim 1, wherein the battery cover is shaped to fit in a recess of the housing.

6. The electronic device of claim 1, wherein the electronic device is a ruggedized electronic device for withstanding a condition including one or more of a drop onto a non-yielding surface, operation under random vibration, water spray, dust particles blowing, humidity, salt fog spray, crash shock test, operation in extreme temperatures, storage in extreme temperatures, and temperature shock.

7. The electronic device of claim 6, wherein the electronic device is a laptop computer.

8. The electronic device of claim 1 further comprising a strap coupled to the battery cover and securing the battery to the conductive heat transfer device.

9. A method for cooling a battery located in an electronic device having a housing and a battery compartment, comprising:
   isolating the battery compartment with a bulkhead;
   positioning the battery in the battery compartment, the battery comprising a battery cell;
   positioning a battery cover including:
      a body including an external surface;
      an internal surface; and
      a convective heat transfer device on the external surface of the battery cover, the body having a thickness between the internal surface and the external surface of about two millimeters, the convective heat transfer device formed to increase the surface area of the external surface of the battery cover;
   a conductive heat transfer device on the internal surface of the battery cover, wherein the conductive heat transfer device is formed of a softer material than the battery;
   a gasket interposed between the battery cover and the housing;
   actuating a latch assembly to compress the conductive heat transfer device against the battery and further compress the battery cover against the conductive heat transfer device, wherein the battery cover, the gasket and the bulkhead seal the battery compartment; and wherein the outer surface of the battery cover defines a recess and wherein the convective heat transfer device is in the recess, wherein the convective heat transfer device comprises fins, rods or cylinders.

10. The method of claim 9, further comprising positioning the battery cover such that the convective heat transfer device corresponds to the battery cell.

11. The method of claim 9, further comprising forming a plurality of fins on the external surface of the battery cover to increase the surface area of the external surface of the battery cover.

12. The method of claim 9, further comprising forming the housing to have a thickness to provide a degree of protection from mechanical forces.

13. A system for cooling a battery located in an electronic device having a housing and a battery compartment, comprising:
   a bulkhead to isolate the battery compartment from other elements in the electronic device;
   a battery cover for removable coupling with the housing, the battery cover including:
      a body including an external surface;
      an internal surface; and
      a convective heat transfer device on the external surface of the battery cover, the body having a thickness between the internal surface and the external surface of about two millimeters, the convective heat transfer device formed to increase the surface area of the external surface of the battery cover;
   a conductive heat transfer device on the internal surface of the battery cover, wherein the conductive heat transfer device is formed of a softer material than the battery;
   a gasket interposed between the battery cover and the housing;
   a latch assembly, wherein actuating the latch assembly compresses the conductive heat transfer device against the battery and further compress the battery cover against the conductive heat transfer device, wherein the battery cover, the gasket and the bulkhead seal the battery compartment; and wherein the outer surface of the battery cover defines a recess and wherein the convective heat transfer device is in the recess, wherein the convective heat transfer device comprises fins, rods or cylinders.

14. The system of claim 13, wherein the conductive heat transfer device corresponds with the battery in shape.

15. The electronic device of claim 13, wherein the convective heat transfer device is positioned to correspond to the battery cell.

16. The electronic device of claim 13, wherein the outer surface of the battery cover defines a recess and wherein the convective heat transfer device is in the recess, wherein the heat transfer device comprises fins, rods or cylinders.

17. The electronic device of claim 16, further comprising a gusset on the internal surface of the battery cover and being positioned to correspond to the recess.

18. The electronic device of claim 13, wherein the battery cover is shaped to fit in a recess of the housing.

19. The electronic device of claim 13, wherein the electronic device is a ruggedized electronic device for withstanding a condition including one or more of a drop onto a non-yielding surface, operation under random vibration, water spray, dust particles blowing, humidity, salt fog spray, crash shock test, operation in extreme temperatures, storage in extreme temperatures, and temperature shock.

20. The electronic device of claim 19, wherein the electronic device is a laptop computer.

* * * * *